United States Patent [19]

Burghoff et al.

[11] Patent Number: 4,718,466
[45] Date of Patent: Jan. 12, 1988

[54] CIRCUIT ARRANGEMENT FOR THE ELECTRO-THERMAL MEASUREMENT OF THE FILLING LEVEL IN THE TANK OF A MOTOR VEHICLE

[75] Inventors: Heinz-Georg Burghoff, Reichenbach; Werner Daub, Stuttgart, both of Fed. Rep. of Germany

[73] Assignee: Daimler-Benz Aktiengesellschaft, Stuttgart, Fed. Rep. of Germany

[21] Appl. No.: 938,885

[22] Filed: Dec. 8, 1986

[30] Foreign Application Priority Data

Dec. 6, 1985 [DE] Fed. Rep. of Germany ....... 3543153

[51] Int. Cl.⁴ ............................................. G01F 23/00
[52] U.S. Cl. ...................................... 141/95; 307/118; 141/83; 141/192; 73/861.02; 73/204; 73/295
[58] Field of Search ................... 141/1, 98, 94, 95, 83, 141/192, 198; 307/118; 73/149, 861.01, 861.02, 861.03, 204, 295

[56] References Cited

U.S. PATENT DOCUMENTS

| | | | |
|---|---|---|---|
| 3,603,927 | 9/1971 | Osborne | 73/295 |
| 4,229,798 | 10/1980 | Rosie et al. | 73/149 X |
| 4,319,233 | 3/1982 | Matsuoka et al. | 73/295 X |
| 4,440,200 | 4/1984 | De Vale et al. | 141/95 |
| 4,513,616 | 4/1985 | Bezard et al. | 73/295 |
| 4,522,237 | 6/1985 | Endo et al. | 141/95 |
| 4,529,974 | 7/1985 | Tanaka et al. | 73/204 X |
| 4,571,991 | 2/1986 | Abe et al. | 73/204 X |
| 4,619,140 | 10/1986 | Kuhnel | 73/295 |
| 4,627,840 | 12/1986 | Cuadra et al. | 73/204 X |

FOREIGN PATENT DOCUMENTS 3337779 4/1985 Fed. Rep. of Germany .

Primary Examiner—Henry J. Recla
Assistant Examiner—Ernest G. Cusick
Attorney, Agent, or Firm—Barnes & Thornburg

[57] ABSTRACT

A circuit arrangement for the electro-thermal measurement of the filling level in the tank of a motor vehicle which includes a resistance sensor adapted to be heated during a heating time of a sampling period. In order to assure that the resistance sensor can cool off again within the sampling period even after several starting attempts of the engine, the sequence control of the circuit arrangement connected with the voltage supply is connected with a further voltage source from which, after turning off the voltage supply, the sequence control is continued to be supplied with voltage by a switching circuit over a time interval which corresponds to the termination of the sampling period.

5 Claims, 2 Drawing Figures

CIRCUIT ARRANGEMENT FOR THE ELECTRO-THERMAL MEASUREMENT OF THE FILLING LEVEL IN THE TANK OF A MOTOR VEHICLE

BACKGROUND AND SUMMARY OF THE INVENTION

The present invention relates to a circuit arrangement for the electro-thermal measurement of the filling level in the tank of a motor vehicle which includes a resistance sensor heated by a constant current and a sequence control for the cyclic operation of an evaluation circuit, whereby the resistor sensor is adapted to be heated during a sampling period and the voltage or current values are measured at the beginning and at the end of the heating period of the resistance sensor for indicating the filling level of the tank.

A circuit arrangement is already known (DE-OS No. 33 37 779), in which the filling level similar as with a heat wire probe is determined by means of an electro-thermal immersion tube generator. An ohmic resistance sensor immersed in the tank is Periods—typically 20 seconds to 60 seconds—for a predetermined heating period of typically 0.5 seconds to 2 seconds and the voltage or the current at the beginning and at the end of the heating period is measured and the change thereof is correspondingly evaluated. In a motor vehicle, the first measurement takes place after a predetermined time of about 5 seconds after the starting of the engine. This time period is necessary in order to assure a sufficiently high voltage supply after the engine start and is selected as brief as possible in order to be able to indicate as rapidly as possible the actual filling level. The time interval (sampling period-heating period) between two measurements, by contrast, is necessary in order to cool off the resistance sensor again after a load (cool-off period).

If the engine is now successively started several times within a sampling period, the resistance sensor can no longer cool off which leads to an undesired temperature rise and therewith to error measurements.

It is therefore the object of the present invention to so construct a circuit arrangement that an undesired temperature increase in the resistance sensor and therewith error measurements are avoided.

The underlying problems are solved according to the present invention in that the sequence control electrically connected with the voltage supply is electrically connected with a further voltage source from which, after the turning-off of the voltage supply, the sequence control continues to be supplied with voltage by way of switching means over a time interval corresponding to the end of the sampling period and which after this time interval is automatically turned off by the switching means.

These and other objects, features and advantages of the present invention will become more apparent from the following description when taken in connection with the accompanying drawing which shows, for purposes of illustration only, two embodiments in accordance with the present invention, and wherein:

DETAILED DESCRIPTION OF THE DRAWINGS

Figure 1:
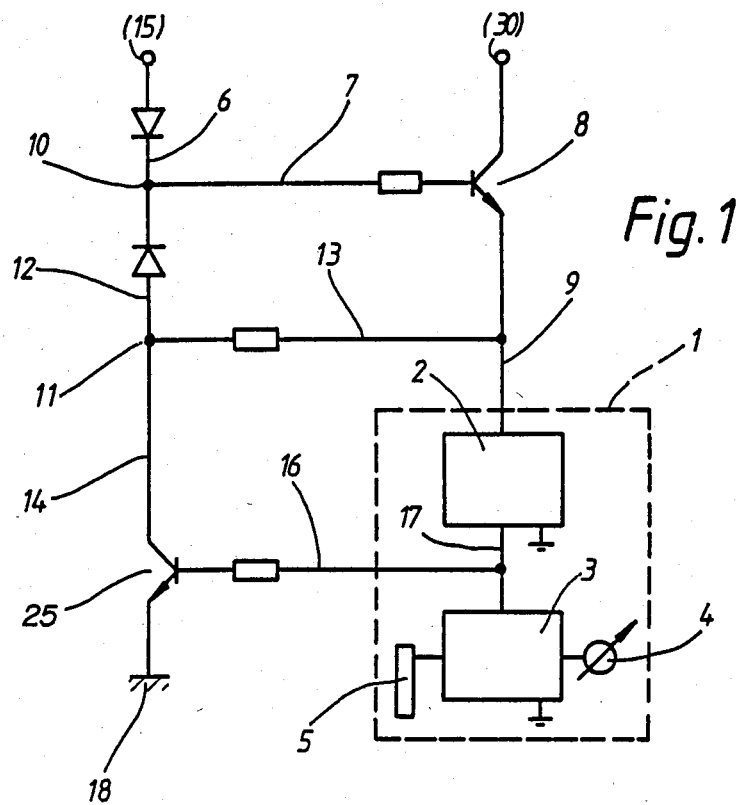
FIG. 1 is a schematic diagram of a first embodiment of a circuit arrangement in accordance with the present invention.

Referring now to the drawing wherein like reference numerals are used throughout the two views to designate like parts, a sequence control 2—which can be constructed as a $\mu P$ (microprocessor) with a timing element of any conventional construction—and an evaluation circuit 3 electrically connected with the sequence control 2 and including an indicating device 4, again of any conventional construction, are arranged inside of a module or a component group 1. A schematically illustrated resistance sensor 5, which is connected with the evaluation circuit 3, is built into the tank of a motor vehicle as an electro-thermal immersion tube generator. The evaluation circuit 3 may be constructed as disclosed in the aforementioned DE-OS.

According to FIG. 1, the sequence control 2 is connected for its voltage supply with the terminal (15) of the vehicle power supply by way of the line 6 including a diode connected in the forward conducting direction, the line 7 including a base resistor, a transistor 8 (npn-type) and the line 9; the terminal (15) represents the output of the ignition switch (not shown). A line 12 including a diode connected in the reverse direction is connected between the point of connection 10 of the lines 6 and 7 and the line 9 leading to the sequence control 2 and in series therewith a line 13 including a resistance. A further line 14 including a further transistor 25 (npn-type) leads from the point of connection 11 of the lines 12 and 13 to ground 18. The base of the transistor 25 is connected by way of a line 16 including a base resistor with a line 17 which connects the sequence control 2 with the evaluation circuit 3. Furthermore, the collector of the transistor 8 is connected with the terminal (30) of the vehicle power supply as further voltage source which has a permanent Plus Potential (Plus - terminal of the vehicle battery).

The operation of the circuit arrangement—which may be integrated into the component 1—is now as follows:

If the ignition is turned on, plus potential reaches the terminal (15) and the transistor 8 is rendered conductive. As a result thereof, the terminal (30) is connected by way of the line 9 with the sequence control 2, and the latter is activated. After a lapse of about five seconds, the sequence control 2 produces in its output in the line 17 a first voltage pulse which activates the evaluation circuit 3 for measuring the voltages in the resistance sensor 5 at the beginning and at the end of the heating period, for the evaluation of the voltage change and for a corresponding indication. After termination of this first sampling period (=heating period of 0.5 to 2 seconds+cooling-off period) of, for example, 30 seconds, further voltage pulses then occur each in the spacing of a sampling period for the activation of the evaluation circuit 3. However, the voltage pulses also control the transistor 25 during their pulse duration by way of the line 16 so as to render the transistor 25 conductive, as a result of which the point of connection 11 is connected with ground 18 during each pulse duration.

If the ignition is now again turned off during the first sampling period after termination of the pulse duration, then the sequence control 2 remains connected with the terminal (30) because no voltage pulse exists any longer in the line 17 in the output of the sequence control 2 by reason of the termination of the pulse duration so that the transistor 25 is again rendered non-conductive and plus-potential is present at the point of connection 11 from the terminal (30) by way of the transistor 8 and the line 13. As a result of the presence of the plus-potential at point 11, the transistor 8 remains conductive by way of the lines 12 and 7. The transistor 8 is therefore in a so-called self-holding circuit. As a result thereof, the time measurement for the first sampling period continues to run in the sequence control 2.

If during the first sampling period the ignition is now turned on anew, then this has no influence on the sequence control 2 in the sense of a renewed activation because the sequence control 2 continues to be connected with the terminal (30) by way of the transistor 8 connected in the self-holding circuit and thus is not interrupted in its time measurement. As a result thereof, no further voltage pulse can be produced by the sequence control 2 during the first sampling period which would activate the evaluation circuit 3 for a further measurement on the resistance sensor 5. An undesired temperature increase at the resistance sensor 5 and therewith error measurements are effectively prevented thereby.

If, by contrast, the ignition is not turned on again during the first sampling period, then a voltage pulse for the second sampling period is produced by the sequence control 2 after termination of the time interval of the first sampling period. This voltage pulse in the output of the sequence control 2 again controls the transistor 15 to be conductive whereby the point of connection 11 is connected with ground 18 during the pulse duration so that the self-holding action of the transistor 8 is cancelled. The connection between the terminal (30) and the sequence control 2 is interrupted thereby so that the sequence control 2 cannot unnecessarily drain the vehicle battery as quiescent current load.

Figure 2:
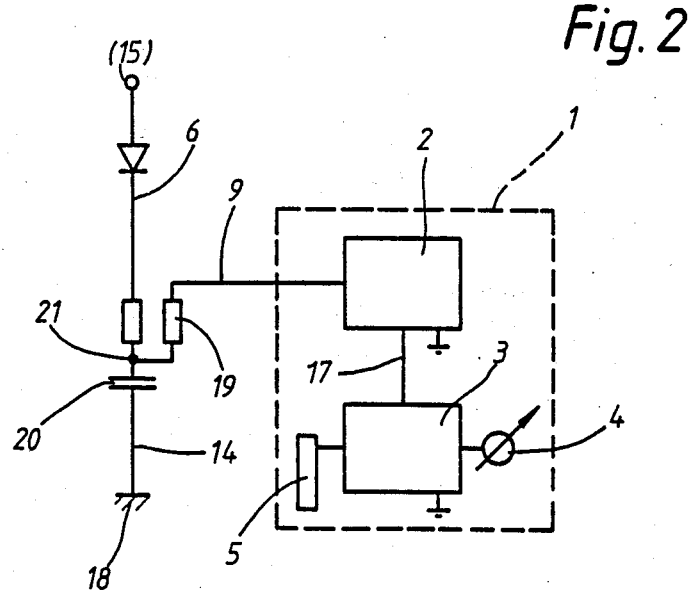
FIG. 2 is a schematic diagram of a second embodiment of a circuit arrangement in accordance with the present invention.

According to FIG. 2, the sequence control 2 is connected with the terminal (15) of the vehicle power supply for its voltage supply by way of the line 6 including a diode connected in the forward direction and a charging resistance and by way of the line 9 including a discharge resistance 19. A condenser 20 as further voltage source is connected between the point of connection 21 of the lines 6 and 8 and ground 18; the condenser 20 together with the resistor 19 forms an RC-element whereby the resistance 19 may itself be formed by the high input resistance of the sequence control 2. By appropriate dimensioning of the diode connected in the line 6 and of the charging resistance and of the condenser 20, on the one hand, a very small charging time constant can be achieved and, on the other hand, also a very large discharge time constant can be achieved in conjunction with the discharge resistance 19 and the condenser 20, so that after turning on the ignition, the condenser 20 is charged very rapidly whereas after turning off the ignition, the energy supply for the sequence control continues to be maintained over a time interval corresponding maximally to the sampling period. Thus, like the transistor 8 in the embodiment of FIG. 1, the resister 19 and the condensor 20 comprise a switching means.

Operationally this means that if during the first sampling period initiated by turning on the ignition, the ignition is turned off and turned on anew, this has no influence on the sequence control 2 in the sense of a renewed activation because the sequence control 2 continues to be connected with the condenser 20 by way of the line 9 and thus—because it is continued to be supplied with voltage—was not interrupted in its time measurement during the first sampling period. No further voltage pulse can thus be produced during the first sampling period by the sequence control 2 also with this circuit arrangement which voltage pulse would activate the evaluation circuit 3 for a further measurement at the resistance sensor 5, as a result of which an undesired temperature rise in the resistance sensor 5 and therewith error measurements are effectively prevented. If, by contrast, the ignition is not turned on again during the first sampling period, then the sequence control is turned off automatically after an interval corresponding to the sampling period because after this time interval the condenser 20 has discharged to such a value as lies below the requisite operating voltage of the sequence control. In certain preferred embodiments, the discharge time constant of the condensor is a multiple of the time interval of a sampling period.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A circuit arrangement for the electro-thermal measurement of the filling level in a tank of a motor vehicle, comprising resistance sensor means operable to be heated with a substantially constant current, a voltage supply, a further voltage source evaluation circuit means operatively connected with said resistance sensor means, and sequence control means for controlling the operation of said evaluation circuit means in cyclic sampling periods, with the voltage supply effectively turned-on, in such a manner that the sensor means is heated during a heating period at the beginning of a sampling period and the corresponding voltage or current values in the sensor means are measured at the beginning and at the end of the heating period and any changes thereof which depend on an immersion condition of the resistance sensor means, are correspondingly evaluated by the evaluation circuit means for indicating the filling level, the sequence control means operatively connected with the voltage supply being operatively connected with a further voltage source, and switching means operable upon a turning off the voltage supply for supplying the sequence control means with voltage from said further voltage source during a time interval corresponding to the completion of the first sampling period, said further voltage supply being automatically turned off by said circuit means after said time interval.

2. A circuit arrangement according to claim 1, wherein the sequence control means is operatively connected with the voltage supply by way of a line including a diode and a charging resistor and by way of a line including a discharge resistor, and wherein a condenser as further voltage source is operatively connected in a line leading from the point of connection of the two first-mentioned lines to ground.

3. A circuit arrangement according to claim 2, wherein the discharge time constant of a condenser is a multiple of the time interval of a sampling period.

4. A circuit arrangement according to claim 1, wherein the sequence control means is operatively connected with the further voltage source by way of a collector-emitter circuit of a transistor means while a base of said transistor means is operatively connected with said voltage supply, self-holding circuit means coordinated to said transistor means for holding said transistor means conductive, and a further transistor means operatively connected between the voltage supply and ground for cancelling a self-holding action of said self-holding circuit means when the further transistor means is rendered conductive by way of its base by a voltage pulse present in a line operatively connecting the sequence control means with the evaluation circuit means.

5. A circuit arrangement according to claim 1, wherein said resistance sensor means is a electro-thermal immersion tube generator.

* * * * *